(12) United States Patent
Rahurkar (10) Patent No.: US 9,268,809 B2
(45) Date of Patent: Feb. 23, 2016

(54) METHOD AND SYSTEM FOR DOCUMENT UPDATE

(71) Applicant: YAHOO! INC., Sunnyvale, CA (US)

(72) Inventor: Mandar Rahurkar, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 395 days.

(21) Appl. No.: 13/904,140

(22) Filed: May 29, 2013

(65) Prior Publication Data

US 2014/0358847 A1 Dec. 4, 2014

(51) Int. Cl.
 *G06F 7/00* (2006.01)
 *G06F 17/30* (2006.01)
(52) U.S. Cl.
 CPC .............................. *G06F 17/30345* (2013.01)

(58) Field of Classification Search
 CPC ................................................ G06F 17/30345
 See application file for complete search history.

(56) References Cited

U.S. PATENT DOCUMENTS

2003/0061015 A1* 3/2003 Ben-Gal ............. G06K 9/6282
 703/2

* cited by examiner

*Primary Examiner* — Ajith Jacob
(74) *Attorney, Agent, or Firm* — Pillsbury Winthrop Shaw Pittman LLP (57) ABSTRACT

Method and system for document update are provided. Information related to document update in the database is obtained. A stochastic model is generated based on the obtained information. An update sequence is determined based on the stochastic model. The update sequence indicates at least one document that needs to be updated in a time slot. One or more documents are retrieved from the database based on the update sequence. The retrieved one or more documents are updated in the time slot.

20 Claims, 9 Drawing Sheets

METHOD AND SYSTEM FOR DOCUMENT UPDATE

BACKGROUND

1. Technical Field

The present teaching relates generally to document management. More specifically, the present teaching relates to document update in a database.

2. Discussion of Technical Background

With the advancement of information technology, more and more documents need to be stored and organized in databases. Each document in a database may have an index for improving the speed of data retrieval operations. An index of a document should be updated when there is a content update for the document. On the other hand, even in absence of a content update, the index needs to be updated to prevent a hysteresis of a data retrieval operation in the database over a period of time.

Figure 1:
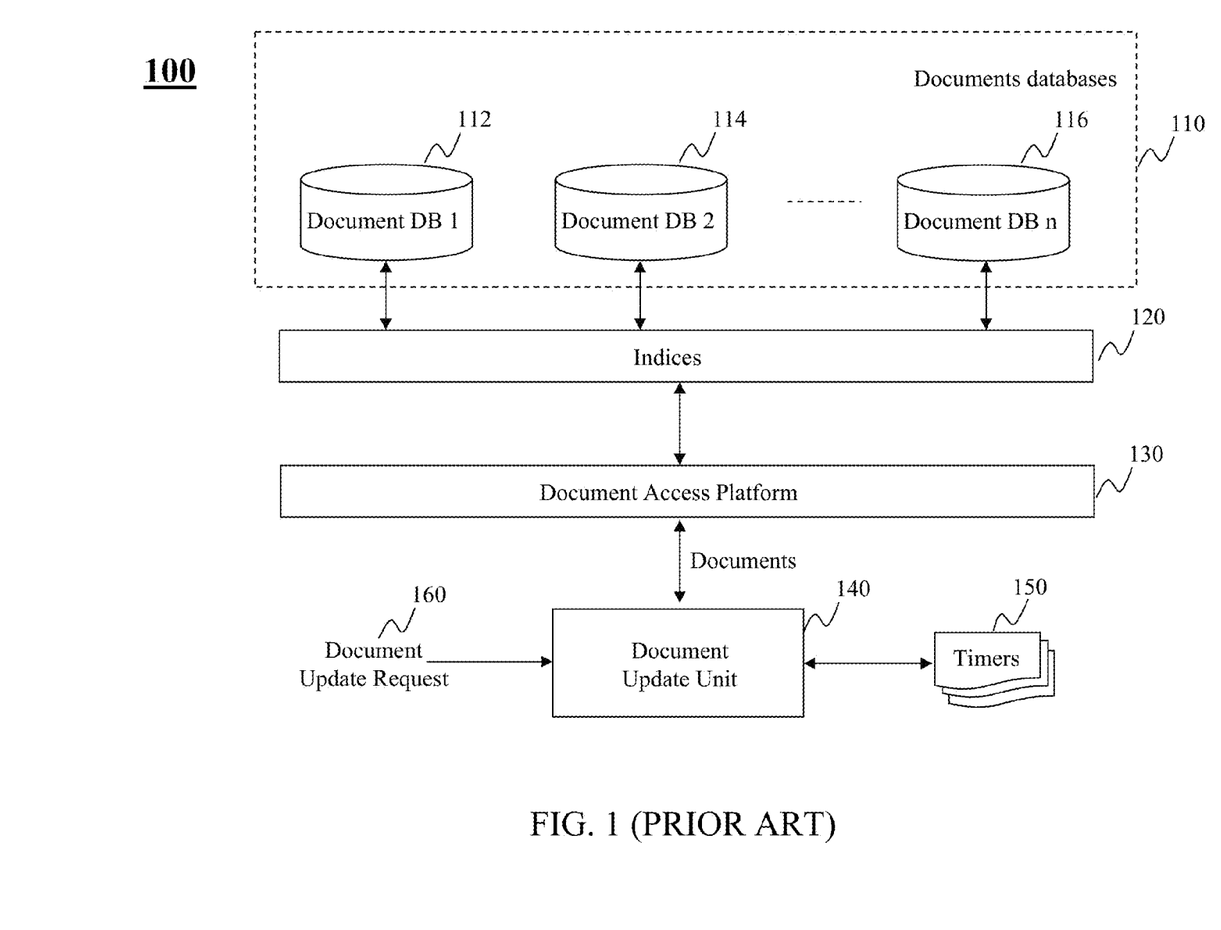
FIG. 1 (PRIOR ART) illustrates an exemplary system for updating documents based on fixed expiry periods, in accordance with a prior art.

Effort has been made to update a document index at an expiry of a fixed time period, i.e., an expiry period. FIG. 1 illustrates an exemplary system 100 for updating documents based on fixed expiry periods, in accordance with a prior art. The system 100 may include one or more document databases 112, 114, 116, a document access platform 130, a document update unit 140, and a plurality of timers 150. Document databases 110 may include a plurality of documents each having an index, so that one or more documents can be accessed, via the indices 120, by the document access platform 130. The document update unit 140 may retrieve documents from 110 by the document access platform 130, and update the documents based on a document update request 160 and the timers 150. The document update request 160 may indicate that one or more documents need to be updated, e.g., due to some content changes. Each of the timers 150 may set up a fixed expiry period for a document or a group of documents to be updated when the expiry period ends.

Since documents are usually categorized into large datasets in a database, each dataset may have a large quantity of documents that have same or close expiry periods and need to be updated at a same time period. Thus, such conventional approaches, e.g., the approach implemented by the system 100 in FIG. 1, may cause a low responding speed or a breakdown of the databases 110, by updating a very large set of documents at a time. Therefore, there is a need to develop a solution for updating documents to avoid the above drawbacks.

SUMMARY

The present teaching describes methods, systems, and programming for document update.

In one example, a method, implemented on a machine having at least one processor, storage, and a communication platform connected to a network for document update in a database, is disclosed. Information related to document update in the database is obtained. A stochastic model is generated based on the obtained information. An update sequence is determined based on the stochastic model. The update sequence indicates at least one document that needs to be updated in a time slot. One or more documents are retrieved from the database based on the update sequence. The retrieved one or more documents are updated in the time slot.

In another example, a system for document update in a database is disclosed. The system comprises a stochastic modeling unit and a stochastic model based document update unit. The stochastic modeling unit is configured for obtaining information related to document update in the database, generating a stochastic model based on the obtained information, and determining an update sequence based on the stochastic model. The update sequence indicates at least one document that needs to be updated in a time slot. The stochastic model based document update unit is configured for retrieving one or more documents from the database based on the update sequence, and updating the retrieved one or more documents in the time slot.

Other concepts relate to software for document update in a database. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable tangible and non-transitory medium having information for document update in a database is disclosed. The information, when read by the machine, causes the machine to perform the following. Information related to document update in the database is first obtained. A stochastic model is then generated based on the obtained information. An update sequence is determined based on the stochastic model. The update sequence indicates at least one document that needs to be updated in a time slot. One or more documents are retrieved from the database based on the update sequence. The retrieved one or more documents are updated in the time slot.

Additional benefits and novel features will be set forth in part in the description that follows, and in part will become apparent to those skilled in the art upon examination of the following and the accompanying drawings or may be learned by production or operation of the examples. The benefits of the present teachings may be realized and attained by practice or use of various aspects of the methodologies, instrumentalities and combinations set forth in the detailed examples discussed below.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present teaching, examples of which are illustrated in the accompanying drawings. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Various embodiments in accordance with the present teaching provide method and system related to document update. More specifically, the method and system in various embodiments of the present teaching relate to updating documents based on a stochastic model.

A document may be indexed in a database with an expiry period, which can be a fixed time period starting from the moment when the document was last updated. The document can be updated within the expiry period, even in absence of any content change, to keep the speed of data retrieval operations. If all documents in the database are configured to be updated at the end of their expiry periods, there may be a large set of documents being updated at one time, which may in turn make the database slow or have a breakdown. For example, there might be a thousand documents updated in one day and a same fixed expiry period was set up for them. Then on the day when this expiry period ends, a request is received to immediately update another thousand documents. Thus, two thousand documents are updated at the same time and set up with a same fixed expiry period. If similar situation continuously happens, this set of documents to be updated at the same time may grow larger and larger, to e.g., millions of documents or 80% of the documents in the database. In that scenario, the database can face a slowdown or breakdown by updating so many documents at one time.

Therefore, at least a subset of the documents in the database can be updated before the end of their expiry periods. This may be realized by a stochastic mechanism, e.g., based on a stochastic model. Unlike updating based on a fixed time period, updating based on a stochastic model can prevent an avalanche update of a large set of documents, by amortizing document updates across time.

The stochastic model may be a dynamic model which can be updated based on information continuously collected at the database. This stochastic model may be applied as an alternative or in addition to the fixed time period, to generate a sequence indicating one or more documents to be updated in a time slot.

Additional novel features will be set forth in part in the description which follows, and in part will become apparent to those skilled in the art upon examination of the following and the accompanying drawings or may be learned by production or operation of the examples.

Figure 2:
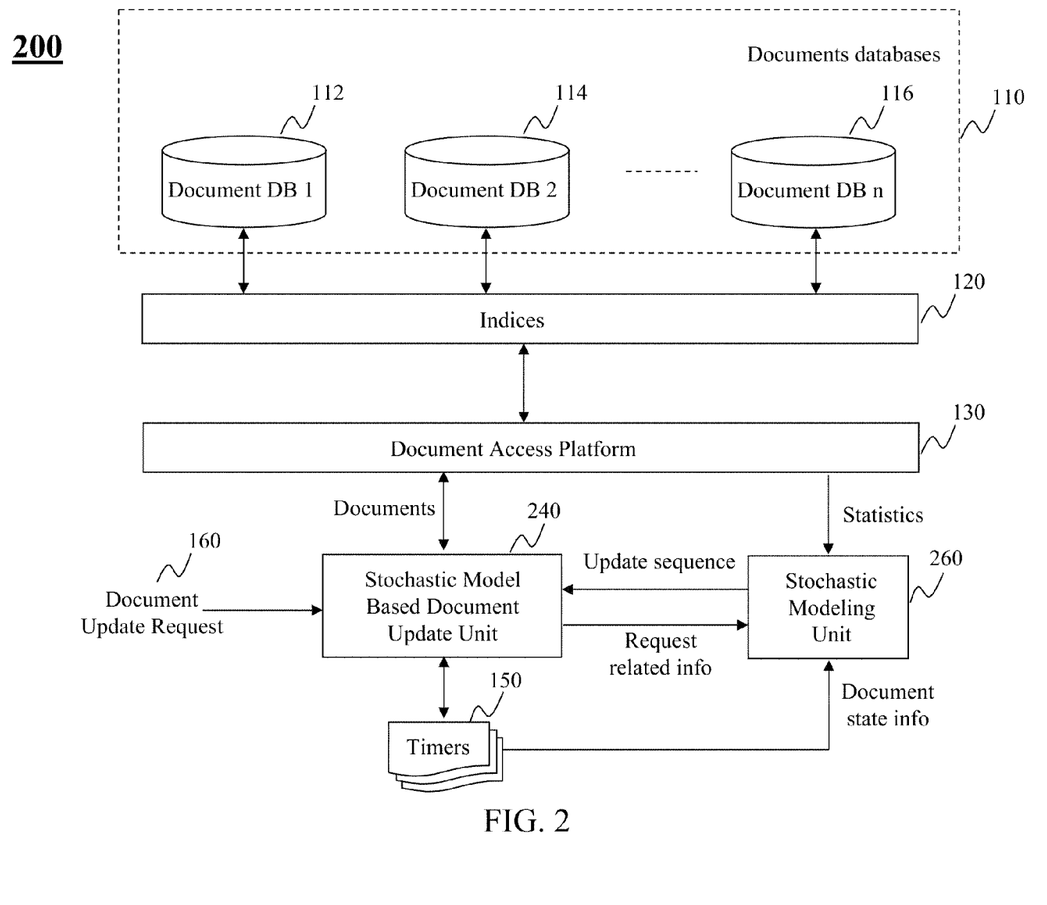
FIG. 2 illustrates an exemplary system for updating documents based on a stochastic model, in accordance with one embodiment of the present teaching.

FIG. 2 illustrates an exemplary system 200 for updating documents based on a stochastic model, in accordance with one embodiment of the present teaching. The system 200 may also include one or more document databases 112, 114, 116, a document access platform 130 configured for accessing the databases 110 via indices 120 of the documents in the databases 110, and a plurality of timers 150. A document update request 160 may be sent by a user of the databases or automatically generated based on a user action, e.g., updating content of some documents in the databases 110. The document update request 160 may indicate that one or more documents need to be updated, e.g., due to some content changes. Each of the timers 150 may set up a fixed expiry period for a document or a group of documents to be updated when the expiry period ends.

Different from the system 100, the system 200 may include a stochastic modeling unit 260 and a stochastic model based document update unit 240. The stochastic model based document update unit 240 may retrieve documents from the databases 110 by the document access platform 130, and update the retrieved documents. The stochastic model based document update unit 240 may receive a document update request 160 with respect to a first update sequence of documents to be updated, e.g., due to some content changes in the documents. The stochastic model based document update unit 240 may also retrieve and update a second update sequence of documents that are, determined by the timers 150, reaching the end of their fixed expiry periods. Different from the document update unit 140 in the system 100, the stochastic model based document update unit 240 may also retrieve and update a third update sequence of documents that need to be updated, determined by the stochastic modeling unit 260, based on a stochastic model. The stochastic model based document update unit 240 may determine an aggregated sequence of documents to be updated, based on one or more of the three update sequences.

The stochastic model based document update unit 240 may update documents in a serial of time slots based on the timers 150. A time slot may be one hour, one day, or one or more weeks, depending on different system configurations. For example, in each time slot, the timers 150 may send a sequence indicating one or more documents whose expiry periods end. The stochastic model based document update unit 240 may determine an aggregated sequence of documents to be updated in each time slot.

The stochastic model may be utilized to determine a probability for each document to be updated. The probability may be determined based on statistics of document update history in the databases 110, request related information generated based on the document update request 160, and document state information generated by the timers 150. The third update sequence may be determined based on a group of documents having highest probabilities. In accordance with one embodiment, the third update sequence may comprise a subset of a large set of documents that are expiring in a near future, so that the update of the large set of documents can be amortized instead of executed at one time. Details with respect to the stochastic model will be discussed later in accordance with FIGS. 4-6.

In one example, the stochastic model based document update unit 240 may receive only one of the three update sequences to be updated in a time slot. In another example, the stochastic model based document update unit 240 may receive all of the three update sequences to be updated in a time slot. In either situation, the stochastic model based document update unit 240 can retrieve one or more documents based on the received update sequence(s) and update the retrieved document(s).

Figure 3:
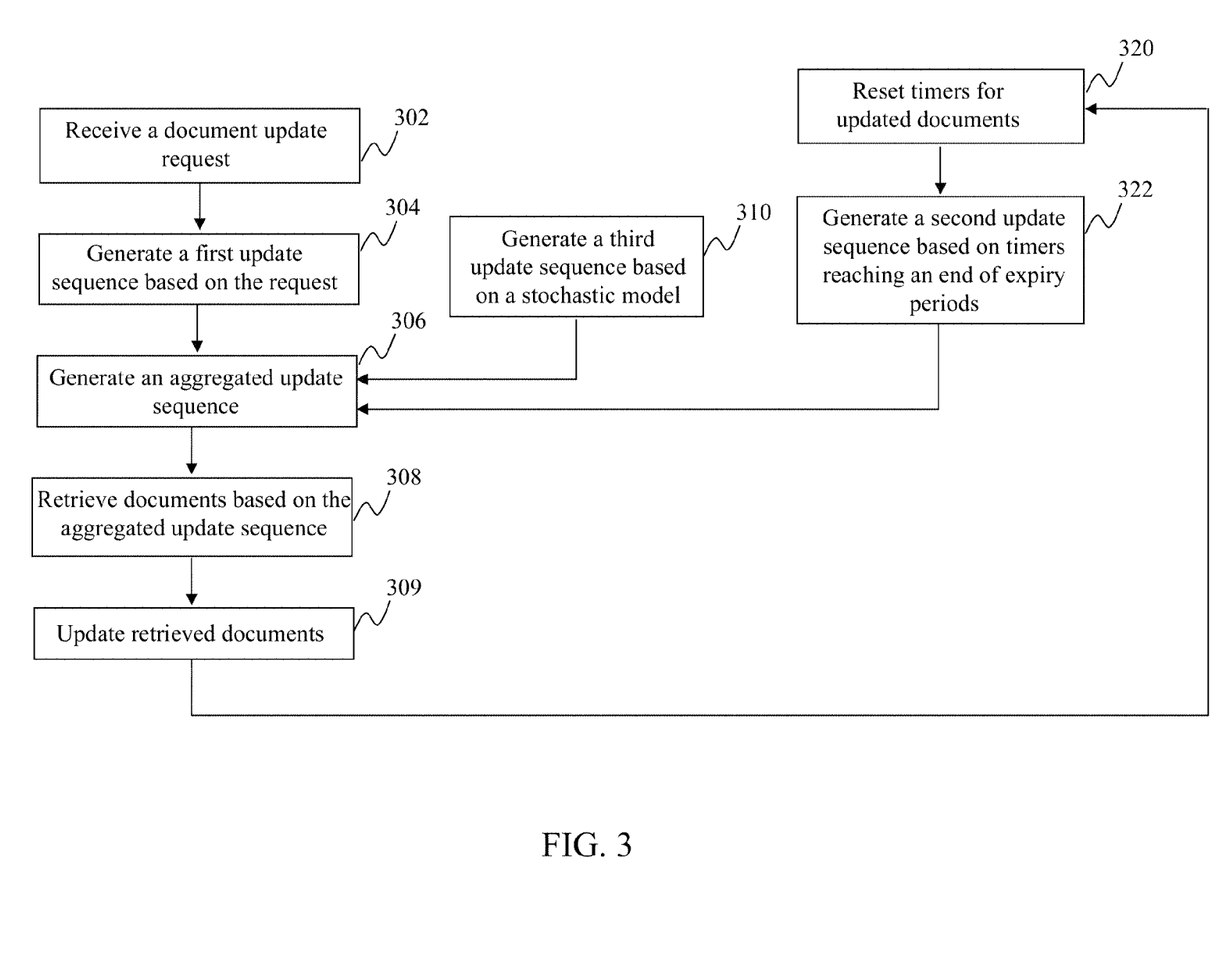
FIG. 3 is a flow chart of an exemplary process performed by a document update system, in accordance with one embodiment of the present teaching.

FIG. 3 is a flow chart of an exemplary process performed by a document update system, e.g., the system 200 in FIG. 2, in accordance with one embodiment of the present teaching. At 302, a document update request may be received, e.g., at the stochastic model based document update unit 240 of the system 200. Then a first update sequence may be generated based on the request, at 304. The first update sequence may indicate a list of documents to be updated due to some content change.

At 320, one or more of the timers 150 may be reset to start new expiry periods for some documents. These documents may be just updated in a previous time slot. At 322, a second update sequence may be generated to indicate one or more documents that need to be updated based on their expiry periods, e.g., their expiry periods will end in a next time slot according to their corresponding timers. Processes of 320 and 322 can be performed independently from 302 and 304. For example, there may be only the first or the second update sequence generated for document update in one time slot. In another example, there may be both the first and the second update sequences generated for document update in one time slot.

At 310, a third update sequence may be generated to indicate one or more documents that need to be updated based on a stochastic model. In one embodiment, the third update sequence may be generated independently from the first and the second update sequences. For example, there may be only the third update sequence generated for document update in one time slot. In another example, there may be only the first and the second update sequences generated for document update in one time slot.

In accordance with another embodiment, the third update sequence with respect to one time slot may be generated based on the first or the second update sequence generated with respect to a previous time slot. For example, an unpredicted update of a large set of documents happened in one previous time slot. Then a fixed expiry period will be set for the large set of documents. If no stochastic model is applied, the large set of documents will need to be updated again in a future time slot when the fixed expiry period ends. To make this situation worse, there may be another large set of documents to be updated in that same future time slot, e.g., due to a future update request. In this example, the third update sequence with respect to a current time slot may be generated based on a stochastic model, for avoiding the potential update of the large set of documents in the future time slot.

At 306, an aggregated update sequence of documents may be generated based on one or more of the three generated update sequences of documents, e.g., at the stochastic model based document update unit 240 of the system 200. In one example, the aggregated update sequence of documents may be a subset of the one or more of the three update sequences of documents. In another example, the aggregated update sequence of documents may comprise all of the one or more of the three update sequences of documents. At 308, documents can be retrieved from the databases 110 based on the aggregated update sequence. Then at 309, the retrieved documents may be updated, in one or more time slots. After some documents are updated in a time slot, these documents will have a new expiry period starting from the time slot, set up in corresponding timers, at 320.

Figure 4:
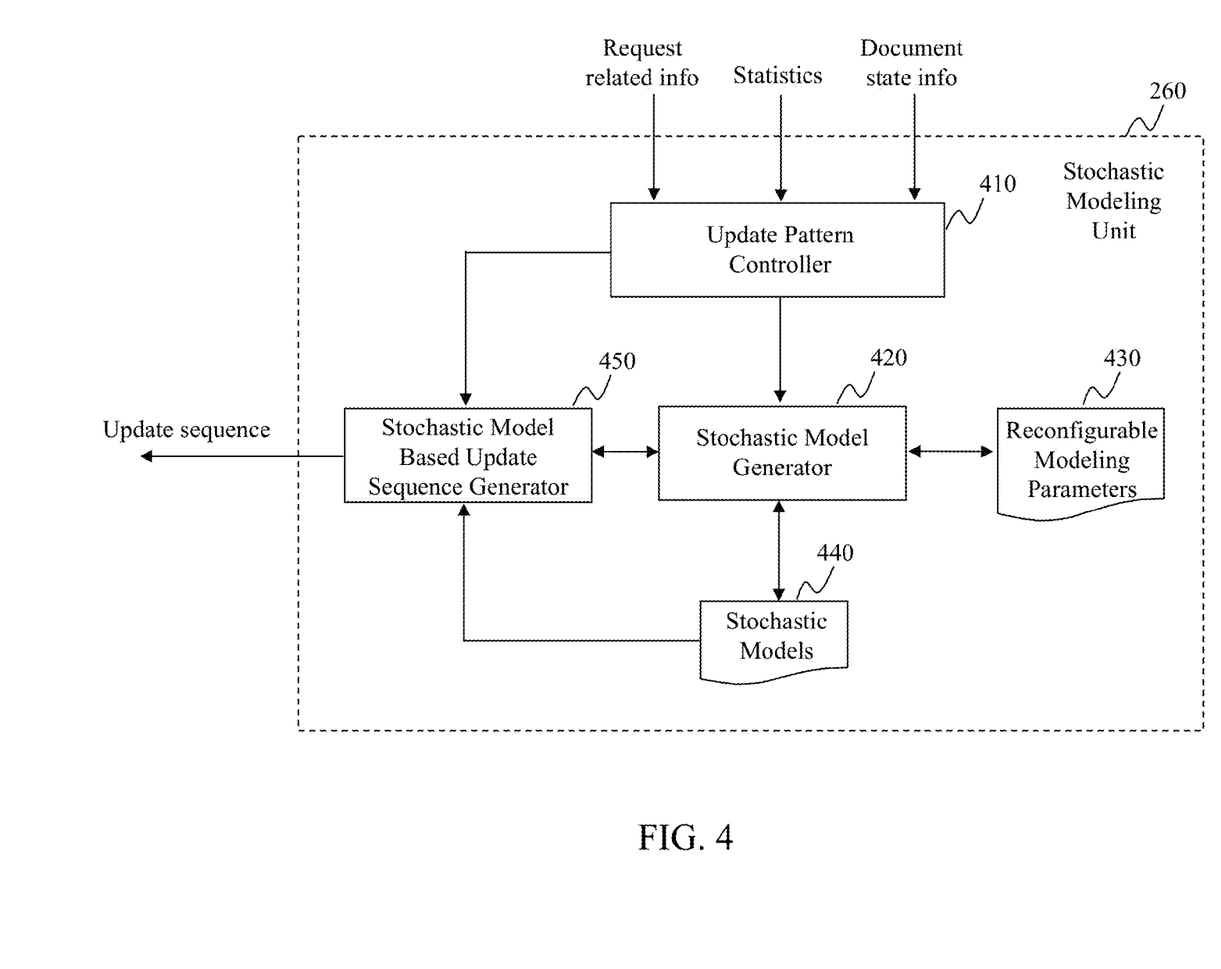
FIG. 4 is a block diagram of an exemplary embodiment of a stochastic modeling unit, in accordance with one embodiment of the present teaching.

FIG. 4 is a block diagram of an exemplary embodiment of a stochastic modeling unit, e.g., the stochastic modeling unit 260 in FIG. 2, in accordance with one embodiment of the present teaching. As shown in FIG. 4, the stochastic modeling unit 260 may include an update pattern controller 410, a stochastic model generator 420, and a stochastic model based update sequence generator 450.

The update pattern controller 410 may be configured for controlling an update pattern of some documents, e.g., the documents in the databases 110. An update pattern can illustrate the quantity of documents updated or to be updated across time, e.g., number of documents updated in each time slot in the past and number of documents to be updated in each time slot in the future.

Figure 6:
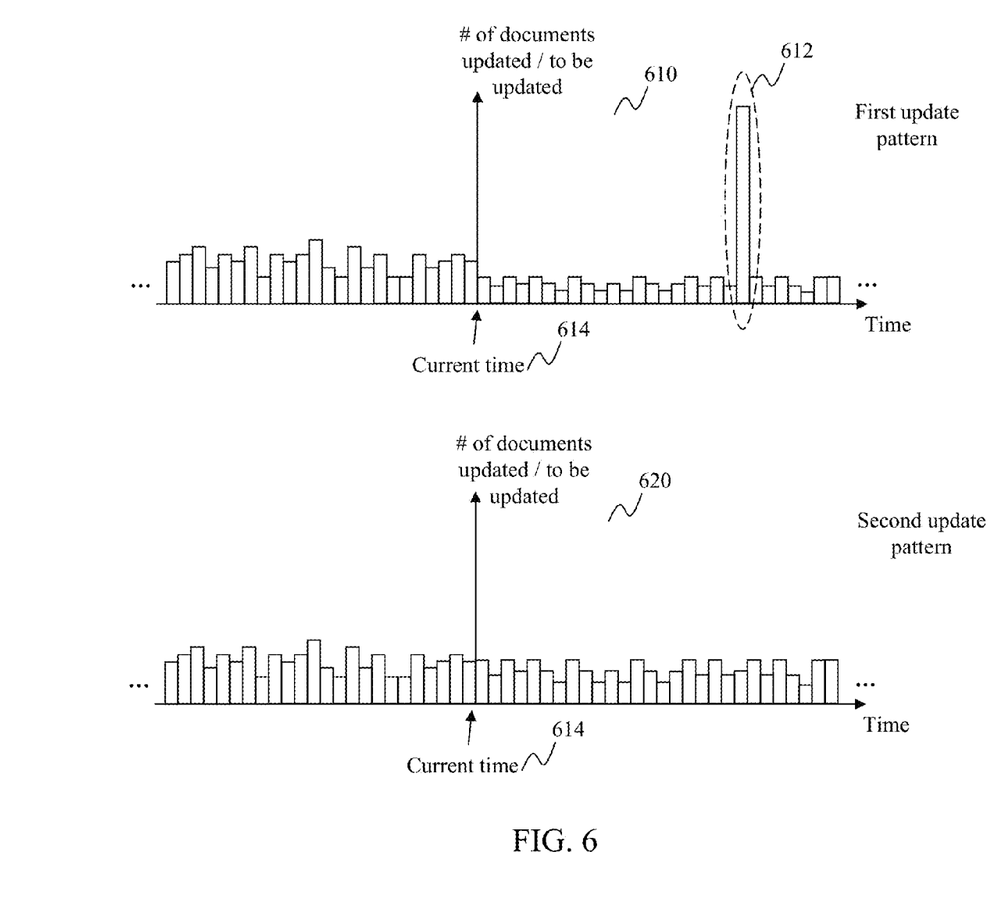
FIG. 6 illustrates two exemplary update patterns, in accordance with one embodiment of the present teaching.

FIG. 6 illustrates two exemplary update patterns, a first update pattern 610 and a second update pattern 620, in accordance with one embodiment of the present teaching.

The first update pattern 610 can illustrate the number of documents updated in time slots before a current time 614 and the number of documents predicted to be updated in time slots after the current time 614. As shown in FIG. 6, the distribution of numbers of updated documents in different time slots is more or less flat, before the current time 614 in the first update pattern 610. But there is a peak 612 shown in the distribution of numbers of documents predicted to be updated in time slots after the current time 614 in the first update pattern 610. The peak 612 may be shown because a large set of documents are predicted to have their expiry periods ending in a same future time slot.

In one example, the first update pattern 610 is generated at the update pattern controller 410 without any stochastic model. The update pattern controller 410 may determine another update pattern, e.g. the second update pattern 620, based on the first update pattern 610 for eliminating the predicted peak 612. In this example, the second update pattern 620 may be determined with an expectation that a stochastic model will be generated to amortize the document update and avoid the peak 612. As shown in FIG. 6, the distribution of numbers of documents expected to be updated in time slots after the current time 614 is much flatter in the second update pattern 620 than the corresponding distribution in the first update pattern 610. The peak 612 has been eliminated in the second update pattern 620.

In another example, the first update pattern 610 is generated at the update pattern controller 410 with an existing stochastic model. In this example, the peak 612 may be shown due to one or more reasons. One reason may be that the existing stochastic model has not been trained thoroughly with the statistics of document updates in the databases 110. For example, the existing stochastic model may be just established based on an experience with some databases other than the databases 110. Another reason may be that some condition changes or some unpredicted request is received after the existing stochastic model is generated. For example, an unpredicted update request is received to update one thousand documents in one time slot, after the existing stochastic model is generated. Then, a fixed expiry period will be set up for the one thousand documents, after they are updated. In a future time slot, the one thousand documents are scheduled to be updated again. Even if a previous update pattern is expected to be flat with the existing stochastic model, a peak will be shown in the current update pattern due to the unpredicted request, e.g., the peak 612. To make this situation worse, there may be another update request received to update another thousand documents in that same future time slot. If similar scenario happens continuously, this accumulative effect will go on and a peak will become higher and higher in a future time slot.

In this example, the update pattern controller 410 may determine another update pattern, e.g. the second update pattern 620, for eliminating the peak 612. The second update pattern 620 may be determined with an expectation that a new or updated stochastic model will be generated to amortize the document update and avoid the peak 612.

The update pattern controller 410 may receive statistics of document update history from the databases 110, request related information from the stochastic model based document update unit 240, or document state information from the timers 150. The statistics may be utilized for generating an update pattern before the current time 614. The statistics may also be utilized for updating parameters of an existing stochastic model, especially when the update pattern before the current time 614 is not flat enough or not meeting an expectation. The request related information may include information related to an update request received at the stochastic model based document update unit 240. For example, if an update request is received for updating a large set of documents, the stochastic model based document update unit 240 may update a subset of the large set of documents and send to the update pattern controller 410 a list of remaining documents to be updated from the large set of documents. The request related information may also include that, in which time slots or by which time slot, the list of remaining documents should be updated. The document state information may include an update state for one or more documents. An update state may indicate whether a document has just been updated, how long ago the document was last updated, etc. The request related information and the document state information may be utilized for generating an update pattern after the current time 614. For example, the peak 612 can be predicted based on the request related information or the document state information.

The update pattern controller 410 may determine the second update pattern 620, based on the received statistics, the received request related information, or the received document state information. The determined second update pattern 620 can be a target for a stochastic model to be generated at the stochastic model generator 420.

The stochastic model generator 420 may be configured for generating one or more stochastic models 440 based on the second update pattern 620. A stochastic model may be utilized to determine a probability for each document to be updated in a time slot. For example, a probability to update a document $d_i$ in a time slot $T_j$ can be calculated based on a stochastic model shown by the following equation:

$$P(d_i)=1-\exp(-C*dt/\text{tau}); \quad (1)$$

wherein $P(d_i)$ represents a probability to update the document $d_i$ in the time slot $T_j$; exp( ) represents an exponential function; dt represents a time period since the document $d_i$ was last updated before the time slot $T_j$; tau represents a function of a document half life of the document $d_i$ from the time slot $T_j$; C is a configurable parameter that can be utilized to modify the stochastic model (1); and i, j represent index of documents and time slots, respectively. After an update of $d_i$, dt in the stochastic model (1) can become greater and greater as time goes on, until the next update of $d_i$. A document half life may be half of an expected life of $d_i$, e.g., an expected time period that $d_i$ can be located in the system 200 without any update, starting from the time slot $T_j$. Thus, tau in the stochastic model (1) may decay to 0 as time goes on. The document half life of the document $d_i$ may be the same as or different from the document half life of another document $d_j$, depending on each document's characteristics, importance, etc.

In accordance with the above exemplary stochastic model, if the document $d_i$ was just updated before the time slot $T_j$, then dt=0 and $P(d_i)$=0 in the stochastic model (1). Thus $d_i$ can have a probability 0 to be updated in the time slot $T_j$, i.e., the document $d_i$ does not need to be updated at all in the time slot $T_j$. On the other hand, if the document $d_i$ was last updated at a long time before the time slot $T_j$ such that the document half life of the document $d_i$ became 0 before the time slot $T_j$, then tau=0 and $P(d_i)$=1 in the stochastic model (1). Thus $d_i$ can have a probability 1 to be updated in the time slot $T_j$.

The parameter C in the stochastic model (1) may adjust a growth rate of $P(d_i)$, as dt increases. For example, there are one thousand documents updated together in one time slot before the time slot $T_j$. In this example, the one thousand documents may have the same dt and the same tau, especially when they are similar documents in the databases 110 in terms of update concerned requirements.

If the parameter C is configured to be the same for these one thousand documents, they may have the same probability to be updated in the time slot $T_j$. This does not necessarily mean that all of the one thousand documents must be updated during the time slot $T_j$. This may mean that the one thousand documents have the same chance to be updated in the time slot $T_j$. But there may be a subset of the one thousand documents eventually being updated in the time slot $T_j$.

On the other hand, the parameter C may be configured to be different for each of these one thousand documents. For example, one document $d_1$ of the one thousand documents may have a greater C than another document $d_2$ of the one thousand documents. This may be configured to avoid a potential peak in a coming update pattern involving an update of the one thousand documents. In addition, this may be due to a relationship between $d_1$ and $d_2$, e.g., $d_2$ in some sense depends on $d_1$, so that it is better to update $d_1$ before updating $d_2$. Therefore, if both documents have a same document half life and are not updated for a same period of time dt by the time slot $T_j$, $P(d_1)$ may be greater than $P(d_2)$. In this case, each of the one thousand documents may have a different probability to be updated in the time slot $T_j$.

The selections of the parameter C can be based on the second update pattern 620. For example, an optimization of the parameter C can be performed for the documents to be updated, in terms of maximizing a likelihood of achieving the second update pattern 620. While the stochastic model (1) includes one reconfigurable parameter C, a stochastic model may include one or more reconfigurable modeling parameters 430 in the stochastic modeling unit 260. If the second update pattern 620 is modified or updated at some time, a stochastic model generated at 420 may need to reconfigure one or more parameters accordingly. Thus, the stochastic model generated at 420 can be a dynamic model. The parameter C can also help to make the probability value calculated in (1) fall in between 0 and 1.

The parameter C can be a number or a function of other parameters. In accordance with one embodiment, the parameter C can be configured so that the stochastic model can perform a similar function as the timers. For example, the parameter C can be a function shown as the following equation:

$$C=1/(\text{maxage}-dt)^+; \quad (2)$$

wherein maxage represents a maximum age that a document $d_i$ can have before its expiry period ends; and $(\text{maxage}-dt)^+$ represents a maximum between (maxage-dt) and 0 so that the parameter C in equation (2) cannot be a negative number. The maxage may be equal to the expiry period of a document when this document was just updated. Taking the parameter C in equation (2), the stochastic model in equation (1) can turn to the following equation:

$$P'(d_i)=1-\exp\{dt/[\text{tau}*(\text{maxage}-dt)^+]\}; \quad (3)$$

wherein $P'(d_i)$ represents a probability to update the document $d_i$ in the time slot $T_j$ with C chosen as in equation (2). If the document $d_i$ was last updated at a long time before the time slot $T_j$ such that dt becomes greater or equal to the maxage for the document $d_i$ at the time slot $T_j$, $(\text{maxage}-dt)^+$ in equation (3) approaches 0. Thus, $P'(d_i)$ will become 1, as shown in equation (3). Therefore, the document $d_i$ can have a probability 1 to be updated in the time slot $T_j$, if the expiry period for $d_i$ ends at or before the time slot $T_j$. In this case, it can be equivalent to have a timer to control the expiry period for $d_i$ and request $d_i$ to be updated when its expiry period ends. An update system may have an update mechanism based on the stochastic model shown in (3), without timers controlling the expiry periods.

The stochastic model based update sequence generator 450 may be configured for generating an update sequence indicating a list of documents to be updated in a time slot based on the stochastic model generated at the stochastic model generator 420. For example, a stochastic model 440 may be generated or updated by the stochastic model generator 420, for amortizing update of a thousand documents in a time slot $T_{10}$ that is the $10^{th}$ time slot after the current time 614. The stochastic model 440 can be utilized at the stochastic model based update sequence generator 450 to calculate probabilities for each of the thousand documents to be updated in each of the 10 time slots after the current time 614, i.e., $T_1, T_2 \ldots T_{10}$. Then the stochastic model based update sequence generator 450 can determine a list of about 100 documents to be updated in each of the 10 time slots.

One or more criteria can be used to determine the update sequence. In one example, the 100 documents with highest probabilities to be updated among the thousand documents can be included in the list for $T_1$. In another example, for each document in each time slot, an algorithm can be run according to the calculated probability of this document to determine whether this document should be updated in this time slot or not. In this case, there may be more than 100 documents to be updated in a time slot. The stochastic model based update sequence generator 450 can set up a threshold, e.g., 200 documents, so that an update sequence for a time slot may include only the first 200 determined documents to be updated based on the algorithms. The stochastic model based update sequence generator 450 may determine which criterion to use based on the second update pattern 620 obtained from the update pattern controller 410.

Figure 5:
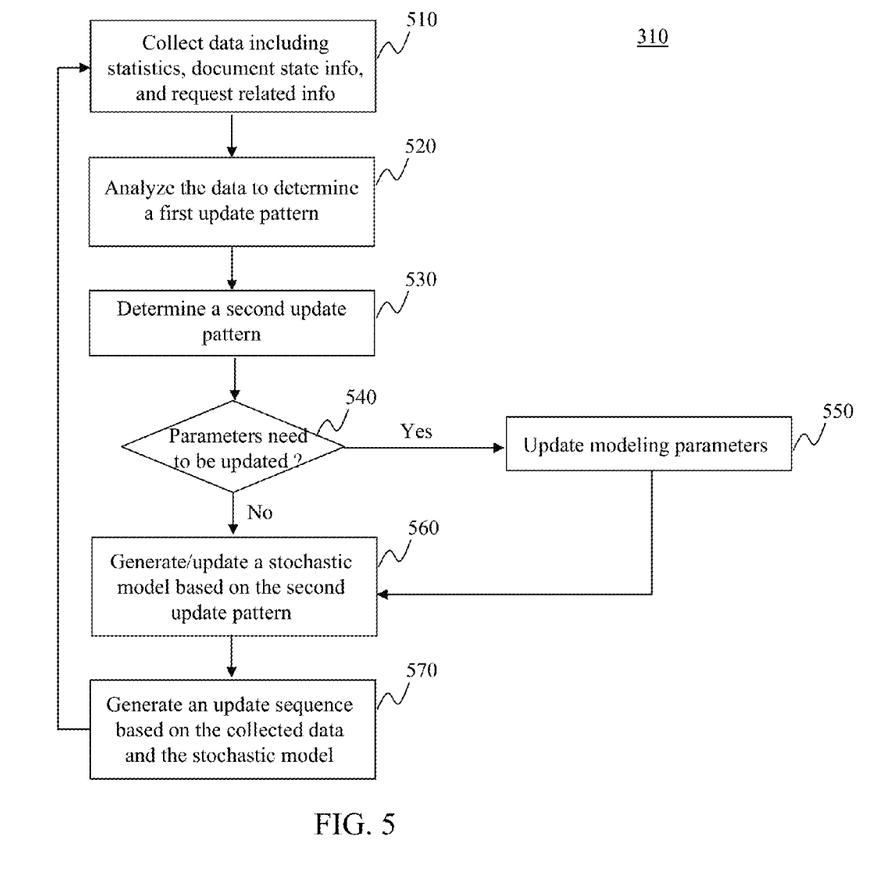
FIG. 5 is a flow chart of an exemplary process performed by a stochastic modeling unit, in accordance with one embodiment of the present teaching.

FIG. 5 is a flow chart of an exemplary process performed by a stochastic model unit, e.g., the stochastic modeling unit 260 in FIG. 4, in accordance with one embodiment of the present teaching. The process in FIG. 5 may be an example of the process in 310 of FIG. 3. At 510, data may be collected at the update pattern controller 410. The data may comprise one or more of statistics of update history, document state information, and request related information. At 520, the collected data may be analyzed determine a first update pattern. Then at 530, a second update pattern may be determined based on the first update pattern. In one example, the second update pattern may be flatter, in terms of distribution of documents to be updated across time, than the first update pattern. At 540, whether modeling parameters of a stochastic model need to be updated is determined. If the modeling parameters need to be updated, at 550, the modeling parameters can be updated, e.g., based on the second update pattern. The process then moves to 560. If the modeling parameters do not need to be updated, the process directly moves to 560. At 560, a stochastic model may be generated or updated based on the second update pattern. Then at 570, an update sequence can be generated based on the collected data and the stochastic model. This update sequence may indicate a list of documents to be updated in one or more time slots. The process may move back to 510 for collecting more data.

Figure 7:
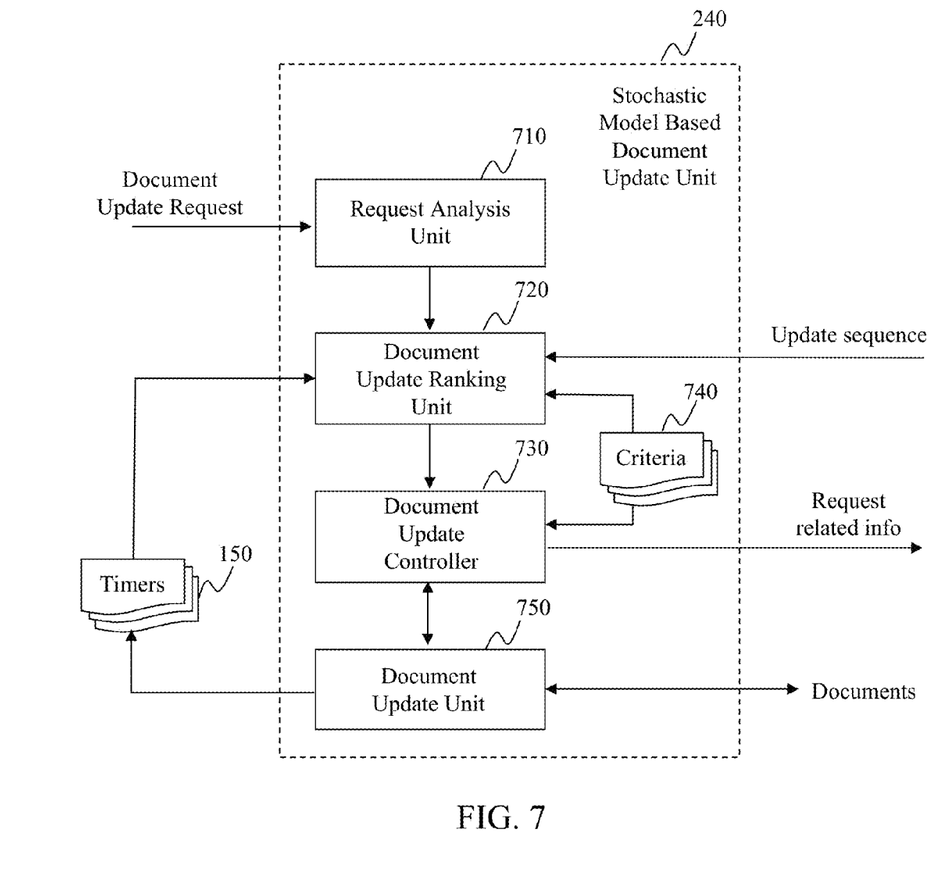
FIG. 7 is a block diagram of an exemplary embodiment of a stochastic model based document update unit, in accordance with one embodiment of the present teaching.

FIG. 7 is a block diagram of an exemplary embodiment of a stochastic model based document update unit, e.g., the stochastic model based document update unit 240 in FIG. 2, in accordance with one embodiment of the present teaching. As shown in FIG. 7, the stochastic model based document update unit 240 in this exemplary embodiment may include a request analysis unit 710, a document update ranking unit 720, a document update controller 730, and a document update unit 750. The request analysis unit 710 may be configured for receiving a document update request and analyzing the request to generate an update sequence based on the request. The update sequence may indicate a list of documents to be updated due to some content changes in these documents.

The document update ranking unit 720 may receive an update sequence of documents based on a stochastic model. The document update ranking unit 720 may also receive an update sequence of documents based on corresponding timers reaching an end of expiry periods for the documents. The document update ranking unit 720 can generate an aggregated update sequence based on all sequences generated and received. The aggregated update sequence may be generated by ranking the documents in the update sequences with some criteria 740. The criteria may be based on sources of the update sequences. For example, the documents in the update sequence generated based on the request may have higher ranks to be updated than the documents in the other update sequences. The documents in the update sequence generated based on corresponding timers may have higher ranks to be updated than the documents in the update sequence generated based on a stochastic model. The criteria may be based on characteristics of the documents. For example, more fundamental documents can have higher ranks to be updated than the other documents. Within the update sequence generated based on a stochastic model, a document with a higher probability can have a higher rank to be updated than another document with a lower probability.

The document update controller 730 may control a document update based on the aggregated update sequence. This may also be performed based on some criteria 740. For example, when the aggregated update sequence includes too many documents, the document update controller 730 may determine to update a portion of them in one time slot and defer an update of the remaining documents in the aggregated update sequence to later time slots. If the number of documents in the aggregated update sequence is greater than a predetermined threshold, the document update controller 730 may determine to update a subset of the aggregated update sequence, e.g., documents with a quantity equaling to the predetermined threshold, or half of the documents in the aggregated update sequence if the quantity is not greater than the predetermined threshold. The portion of documents determined to be updated may be selected based on the ranking at the document update ranking unit 720. After the portion of documents are updated, the document update controller 730 may determine whether there are remaining documents in the aggregated update sequence, and if so, whether a quantity of the remaining documents is greater than the predetermined threshold. The document update controller 730 can treat the remaining documents as documents from a new aggregated update sequence and perform similar processes as discussed before. Whenever the quantity of documents to be updated is not greater than the predetermined threshold, the document update controller 730 can determine to update all of them at a time slot.

The document update controller 730 may also send request related information to the stochastic modeling unit 260. The request related information may include information related to the remaining documents from the aggregated update sequence to be updated in future time slots. As discussed above, the request related information can be utilized by the stochastic modeling unit 260 to generate an update pattern, e.g., the first update pattern 610 in FIG. 6.

Once the document update controller 730 determines which documents to be updated in a time slot, the document update unit 750 may retrieve the documents from the databases 110 and update the retrieved documents in the corresponding time slot. After each update in a time slot, the document update unit 750 may send a notification to reset the timers corresponding to the updated documents.

Figure 8:
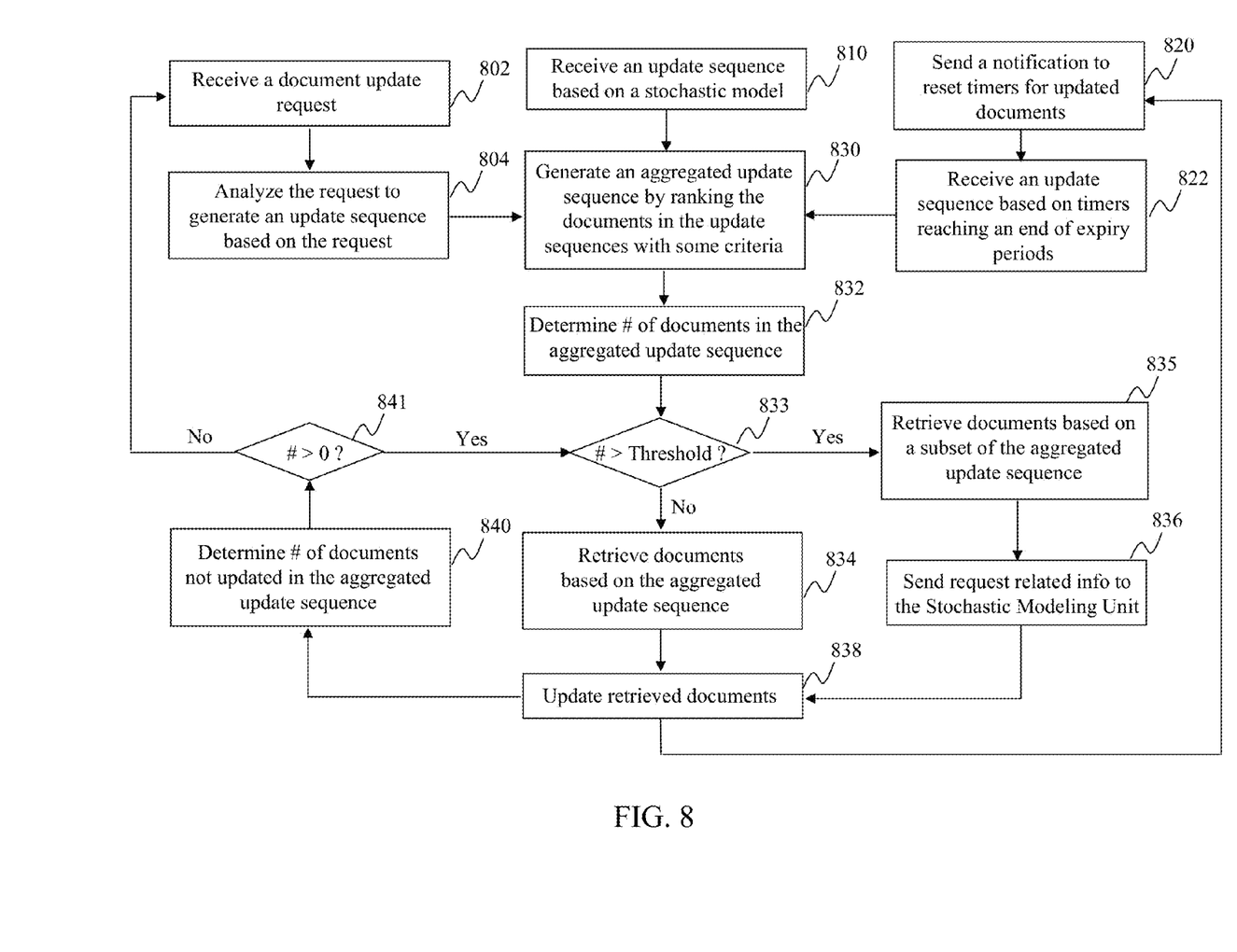
FIG. 8 is a flow chart of an exemplary process performed by a stochastic model based document update unit, in accordance with one embodiment of the present teaching.

FIG. 8 is a flow chart of an exemplary process performed by a stochastic model based document update unit, e.g., the stochastic model based document update unit 240 in FIG. 7, in accordance with one embodiment of the present teaching. At 802, a document update request may be received. Then at 804, the request can be analyzed to generate an update sequence based on the request.

At 810, an update sequence based on a stochastic model may be received. At 822, an update sequence may be received, based on timers reaching an end of expiry periods of some documents. The processes at 810 and 822 may be performed independently from 802 and 804. In each time slot, each of the three update sequences may be received or not, independently from the other two update sequences.

At 830, if there is one or more update sequences received, an aggregated sequence can be generated, e.g., by ranking the documents in the update sequences with some criteria. At 832, the number # of documents in the aggregated update sequence may be determined. At 833, it may be determined that whether the number # is greater than a predetermined threshold or not. If so, the process can move to 835 to retrieve documents based on a subset of the aggregated update sequence. At 836, request related information may be sent to the stochastic modeling unit 260. On the other hand, if the number # is not greater than the predetermined threshold, the process proceeds to 834, where all documents in the aggregated update sequence can be retrieved, e.g., from the databases 110.

After the process in either 834 or 836, the retrieved documents can be updated in a time slot, at 838. Then at 820, a notification can be sent to reset the timers corresponding to the updated documents in the time slot. At 840, the number # of documents not updated yet in the aggregated update sequence may be determined. At 841, it may be determined that whether the number # is greater than 0. If so, the process can move back to 833, where it may be determined that whether the number # is greater than the predetermined threshold or not. If the number # is not greater than 0, the process may move back to 802 to wait for receiving another document update request.

To implement the present teaching, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
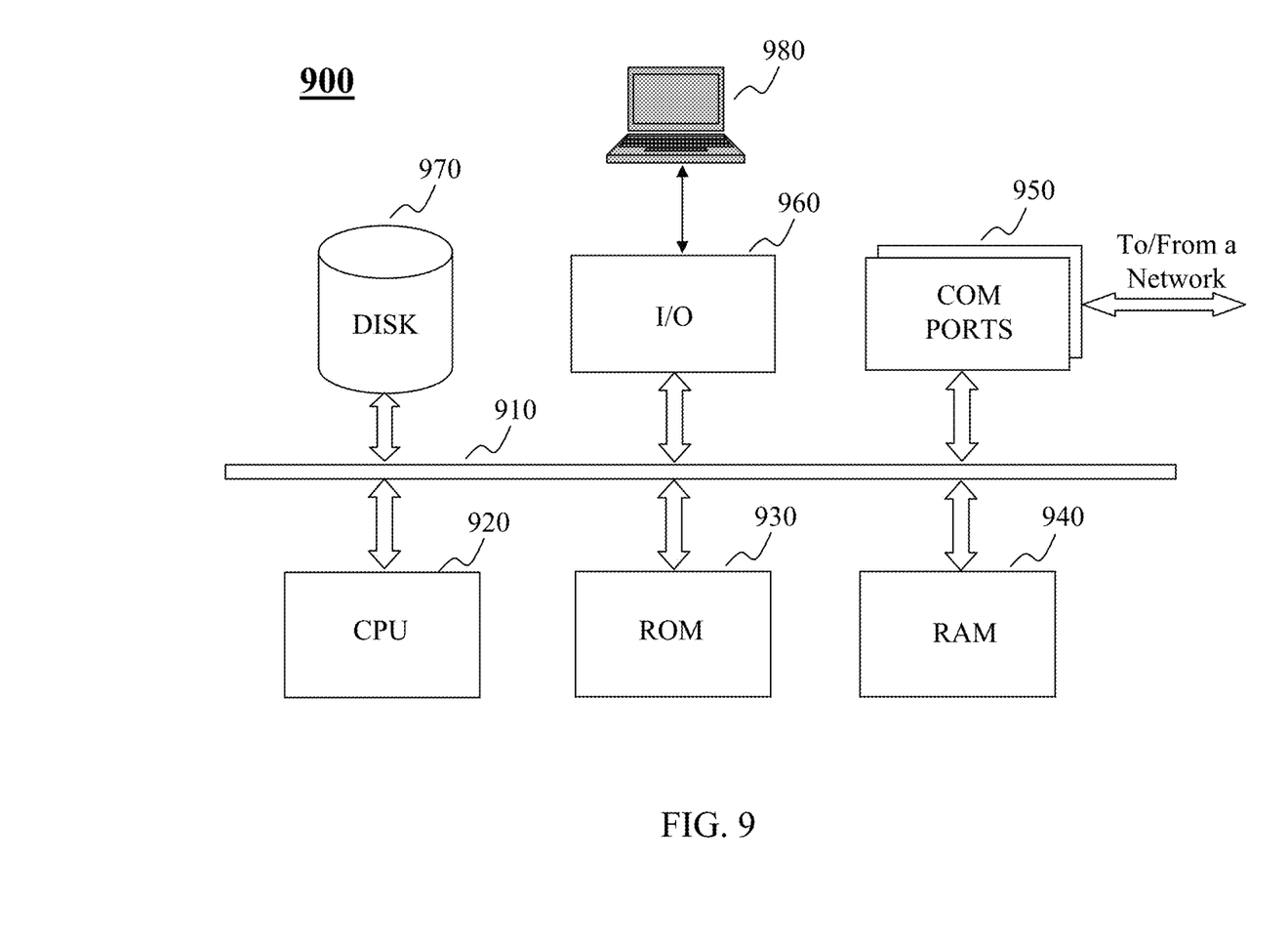
FIG. 9 depicts a general computer architecture on which the present teaching can be implemented.

FIG. 9 depicts a general computer architecture on which the present teaching can be implemented and has a functional block diagram illustration of a computer hardware platform which includes user interface elements. The computer may be a general-purpose computer or a special purpose computer. This computer 900 can be used to implement any components of the system for document update as described herein. Different components of the system 200, 300, e.g., as depicted in FIGS. 2 and 3, can all be implemented on one or more computers such as computer 900, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 900, for example, includes COM ports 902 connected to and from a network connected thereto to facilitate data communications. The computer 900 also includes a central processing unit (CPU) 904, in the form of one or more processors, for executing program instructions. The exemplary computer platform includes an internal communication bus 906, program storage and data storage of different forms, e.g., disk 908, read only memory (ROM) 910, or random access memory (RAM) 912, for various data files to be processed and/or communicated by the computer, as well as possibly program instructions to be executed by the CPU. The computer 900 also includes an I/O component 914, supporting input/output flows between the computer and other components therein such as user interface elements 916. The computer 900 may also receive programming and data via network communications.

Hence, aspects of the method for document update, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teaching is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. The presently disclosed embodiments are therefore to be considered in all respects as illustrative and not restrictive, the scope of the present teaching being indicated by the appended claims and their legal equivalents, and not limited to the foregoing description.

What is claimed is:

1. A method, implemented on a machine having at least one processor, storage, and a communication platform connected to a network for document update in a database, comprising:
    obtaining information related to document update in the database;
    generating a stochastic model based on the obtained information;
    determining an update sequence based on the stochastic model, wherein the update sequence indicates at least one document that needs to be updated in a time slot;
    retrieving one or more documents from the database based on the update sequence; and
    updating the retrieved one or more documents in the time slot.

2. The method of claim 1, wherein generating a stochastic model based on the obtained information comprises:
    determining a first update pattern based on the obtained information;
    determining a second update pattern based on the first update pattern; and
    generating a stochastic model based on the second update pattern.

3. The method of claim 2, wherein:
    each of the first and second update patterns represents a distribution of documents to be updated across time; and
    the second update pattern represents a flatter distribution than the first update pattern.

4. The method of claim 1, wherein the stochastic model is generated based on updating one or more modeling parameters of another stochastic model.

5. The method of claim 1, wherein the obtained information comprises at least one of the following:
    statistics of a document update history of the database;
    request related information based on a document update request; and
    document state information based on one or more fixed expiry periods of documents.

6. The method of claim 5, further comprising:
    determining a second update sequence based on the document update request, wherein the update sequence based on the stochastic model is referred as a first update sequence and the second update sequence indicates one or more documents that need to be updated in the time slot;
    determining a third update sequence based on the one or more fixed expiry periods, wherein the third update sequence indicates one or more documents that need to be updated in the time slot; and
    generating an aggregated update sequence based on at least one of the first, second and third update sequences, wherein retrieving the one or more documents comprises retrieving the one or more documents from the database based on the aggregated update sequence.

7. The method of claim 1, wherein the retrieved one or more documents comprise all documents indicated by the update sequence, when a quantity of the all documents indicated by the update sequence is less than or equal to a predetermined threshold.

8. The method of claim 1, wherein the retrieved one or more documents comprise a subset of all documents indicated by the update sequence, when a quantity of the all documents indicated by the update sequence is greater than a predetermined threshold.

9. A system having at least one processor, storage, and a communication platform connected to a network for document update in a database, comprising:
    a stochastic modeling unit configured for
    obtaining information related to document update in the database,
    generating a stochastic model based on the obtained information, and
    determining an update sequence based on the stochastic model, wherein the update sequence indicates at least one document that needs to be updated in a time slot; and
    a stochastic model based document update unit configured for
    retrieving one or more documents from the database based on the update sequence, and updating the retrieved one or more documents in the time slot.

10. The system of claim 9, wherein the stochastic modeling unit comprises:
an update pattern controller configured for
determining a first update pattern based on the obtained information, and
determining a second update pattern based on the first update pattern; and
a stochastic model generator configured for generating a stochastic model based on the second update pattern.

11. The system of claim 10, wherein:
each of the first and second update patterns represents a distribution of documents to be updated across time; and
the second update pattern represents a flatter distribution than the first update pattern.

12. The system of claim 9, wherein the stochastic model is generated based on updating one or more modeling parameters of another stochastic model.

13. The system of claim 9, wherein the obtained information comprises at least one of the following:
statistics of a document update history of the database;
request related information based on a document update request; and
document state information based on one or more fixed expiry periods of documents.

14. The system of claim 13, wherein:
the stochastic model based document update unit comprises a request analysis unit configured for
receiving the document update request, and
determining a second update sequence based on the document update request, wherein the update sequence based on the stochastic model is referred as a first update sequence and the second update sequence indicates one or more documents that need to be updated in the time slot;
the system comprises one or more timer configured for determining a third update sequence based on the one or more fixed expiry periods, wherein the third update sequence indicates one or more documents that need to be updated in the time slot;
the stochastic model based document update unit comprises a document update ranking unit configured for generating an aggregated update sequence based on at least one of the first, second and third update sequences; and
the one or more documents from the database are retrieved based on the aggregated update sequence.

15. The system of claim 9, wherein the retrieved one or more documents comprise all documents indicated by the update sequence, when a quantity of the all documents indicated by the update sequence is less than or equal to a predetermined threshold.

16. The system of claim 9, wherein the retrieved one or more documents comprise a subset of all documents indicated by the update sequence, when a quantity of the all documents indicated by the update sequence is greater than a predetermined threshold.

17. A machine-readable tangible and non-transitory medium having information for document update in a database, wherein the information, when read by the machine, causes the machine to perform the following:
obtaining information related to document update in the database;
generating a stochastic model based on the obtained information;
determining an update sequence based on the stochastic model, wherein the update sequence indicates at least one document that needs to be updated in a time slot;
retrieving one or more documents from the database based on the update sequence; and
updating the retrieved one or more documents in the time slot.

18. The medium of claim 17, wherein generating a stochastic model based on the obtained information comprises:
determining a first update pattern based on the obtained information;
determining a second update pattern based on the first update pattern; and
generating a stochastic model based on the second update pattern.

19. The medium of claim 18, wherein:
each of the first and second update patterns represents a distribution of documents to be updated across time; and
the second update pattern represents a flatter distribution than the first update pattern.

20. The medium of claim 17, wherein the stochastic model is generated based on updating one or more modeling parameters of another stochastic model.

* * * * *